(12) United States Patent
Chen

(10) Patent No.: US 9,778,483 B2
(45) Date of Patent: Oct. 3, 2017

(54) EYEGLASSES

(71) Applicant: Lin-Yun Chen, Tainan (TW)

(72) Inventor: Lin-Yun Chen, Tainan (TW)

( * ) Notice: Subject to any disclaimer, the term of this patent is extended or adjusted under 35 U.S.C. 154(b) by 0 days.

(21) Appl. No.: 15/008,334

(22) Filed: Jan. 27, 2016

(65) Prior Publication Data

US 2017/0146816 A1    May 25, 2017

(30) Foreign Application Priority Data

Nov. 19, 2015   (TW) .............................. 104138180 A

(51) Int. Cl.
*G02C 5/14* (2006.01)
*G02C 5/20* (2006.01)
*G02C 5/22* (2006.01)
*G02C 3/00* (2006.01)

(52) U.S. Cl.
CPC .............. *G02C 5/20* (2013.01); *G02C 3/006* (2013.01); *G02C 5/143* (2013.01); *G02C 5/146* (2013.01); *G02C 5/2209* (2013.01); *G02C 5/2263* (2013.01); *G02C 2200/02* (2013.01); *G02C 2200/08* (2013.01); *G02C 2200/18* (2013.01)

(58) Field of Classification Search
CPC ........ G02C 3/006; G02C 5/143; G02C 5/146; G02C 5/2209; G02C 5/2263; G02C 5/20; G02C 5/001–5/124; G02C 1/04; B29C 45/0017

USPC ......... 351/63, 110–121, 140, 153, 156, 157; 16/228, 240, 245

See application file for complete search history.

(56) References Cited

U.S. PATENT DOCUMENTS 6,364,479 B1 *   4/2002   Wu .................... G02C 5/2263
                                                        351/120
7,543,932 B1 *   6/2009   Isabelle .................. G02C 5/124
                                                        351/111

* cited by examiner

*Primary Examiner* — Mohammed Hasan
*Assistant Examiner* — Mustak Choudhury
(74) *Attorney, Agent, or Firm* — Alan D. Kamrath; Kamrath IP Lawfirm, P.A.

(57) ABSTRACT

A pair of eyeglasses includes a glasses frame, two connecting members, and two temples. The glasses frame includes a first end and a second end spaced from the first end in a lateral direction, each of which forms a coupling base extending inward in a longitudinal direction perpendicular to the lateral direction. Each connecting member includes spaced first and second segments, and the first segment is detachably connected to a corresponding coupling base of the glasses frame. Each temple performs upward/downward pivotal rotation relative to the glasses frame according to an axis defined by a pivot which connects the front end of each temple with the second segment of one of the connecting members. The pair of eyeglasses allows each temple to be removed from the glasses frame easily.

7 Claims, 11 Drawing Sheets

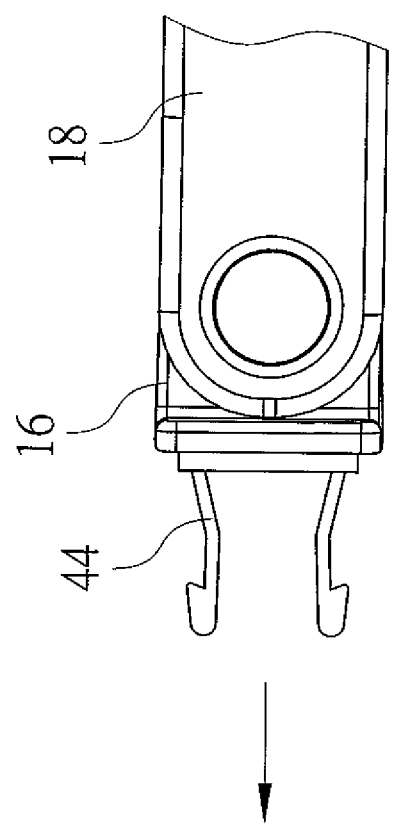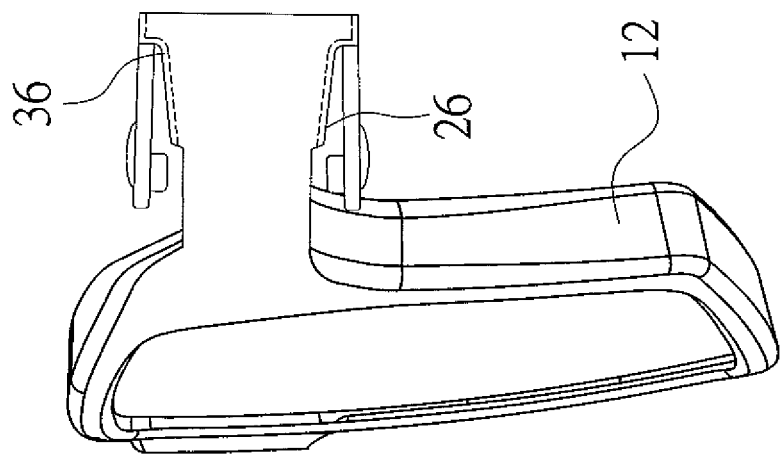
FIG.10

EYEGLASSES

BACKGROUND OF THE INVENTION

1. Field of the Invention

The present invention relates to a pair of eyeglasses and, more particularly, to a pair of eyeglasses with temples conveniently replaced and performing pivotal rotation relative to a glasses frame.

2. Description of the Related Art

In the era of material life being promoted, people with novelty aspiration are fastidious about portable decorative objects. For example, sunglasses or leisure eyeglasses are popularized among persons who value the eyeglasses aesthetically matching costumes. In this regard, a user who prefers versatile fancy sunglasses or leisure eyeglasses may change temples in a pair of eyeglasses frequently to match his/her mood or costumes but may finally buy a new pair of eyeglasses without cost effectiveness because the temples of the eyeglasses are difficult to be replaced.

Specifically, a pair of eyeglasses conventionally includes a frame and two temples pivotally fitted at both sides of the frame. Each temple directly joining and corresponding to the frame with a pivotal member such as a screw or a pin can be folded or unfolded. However, a user intending to change an old temple usually makes use of a tool to remove the pivotal member and strenuously secure it at a new temple. Moreover, a pair of conventional eyeglasses usually hung on a user's chest with a neck cord does not match the user's apparel, because a temple in the pair of eyeglasses performs pivotal rotation relative to a glasses frame in a folding/unfolding direction rather than an upward/downward direction. In addition, it is inconvenient to remove a pair of eyeglasses hung on a user's chest with a neck cord when the pair of eyeglasses along with the neck cord need to be taken down from the user's head.

BRIEF SUMMARY OF THE INVENTION

Thus, an objective of the present invention is to provide a pair of eyeglasses which favorably matches apparel, plays a role in ornamentation, and allows temples to be removed/replaced or fixed conveniently.

To achieve this and other objectives, a pair of eyeglasses of the present invention includes a glasses frame, a connecting member, and a temple. The glasses frame includes first and second ends spaced in a lateral direction and at least one lens support slot between the first and second ends. The glasses frame further includes two coupling bases each extending inward from one of the first and second ends of the glasses frame in a longitudinal direction perpendicular to the lateral direction. The connecting member includes a first segment and a second segment spaced from the first segment in the longitudinal direction. The first segment of the connecting member is connected to a corresponding coupling base of the glasses frame. A recessed portion is formed in an outer surface of the second segment of the connecting member, and a plurality of serrate slots is designed in an inner perimeter of the recessed portion. A positioning block is rotatably held inside the recessed portion and includes at least one notch and at least one serrate portion around an outer circumference thereof. The at least one serrate portion of the positioning block is coupled with at least one of the plurality of serrate slots. The temple includes front and rear ends spaced in a length direction thereof. At least one convex column is formed at the front end of the temple and coupled with the at least one notch of the positioning block.

A pivot extends through the temple and the positioning block in the lateral direction and is driven into the connecting member for combination of the temple and the connecting member, so that the temple performs upward/downward pivotal rotation relative to the glasses frame about an axis defined by the pivot.

In a preferred form, each coupling base includes outer and inner surfaces spaced in the lateral direction, with the inner surfaces of the two coupling bases opposite to each other. A recess and a first coupling piece are provided in the outer surface of each coupling base. The first segment of the connecting member is held in the recess of the corresponding coupling base and includes a second coupling piece which combines the first coupling piece on the corresponding coupling base, so that the connecting member is detachably fixed on the glasses frame.

Preferably, the first and second coupling pieces are two magnets, respectively.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 10 is a schematic, exploded view of a pair of eyeglasses in a fourth embodiment of the present invention.

DETAILED DESCRIPTION OF THE INVENTION

Figure 1:
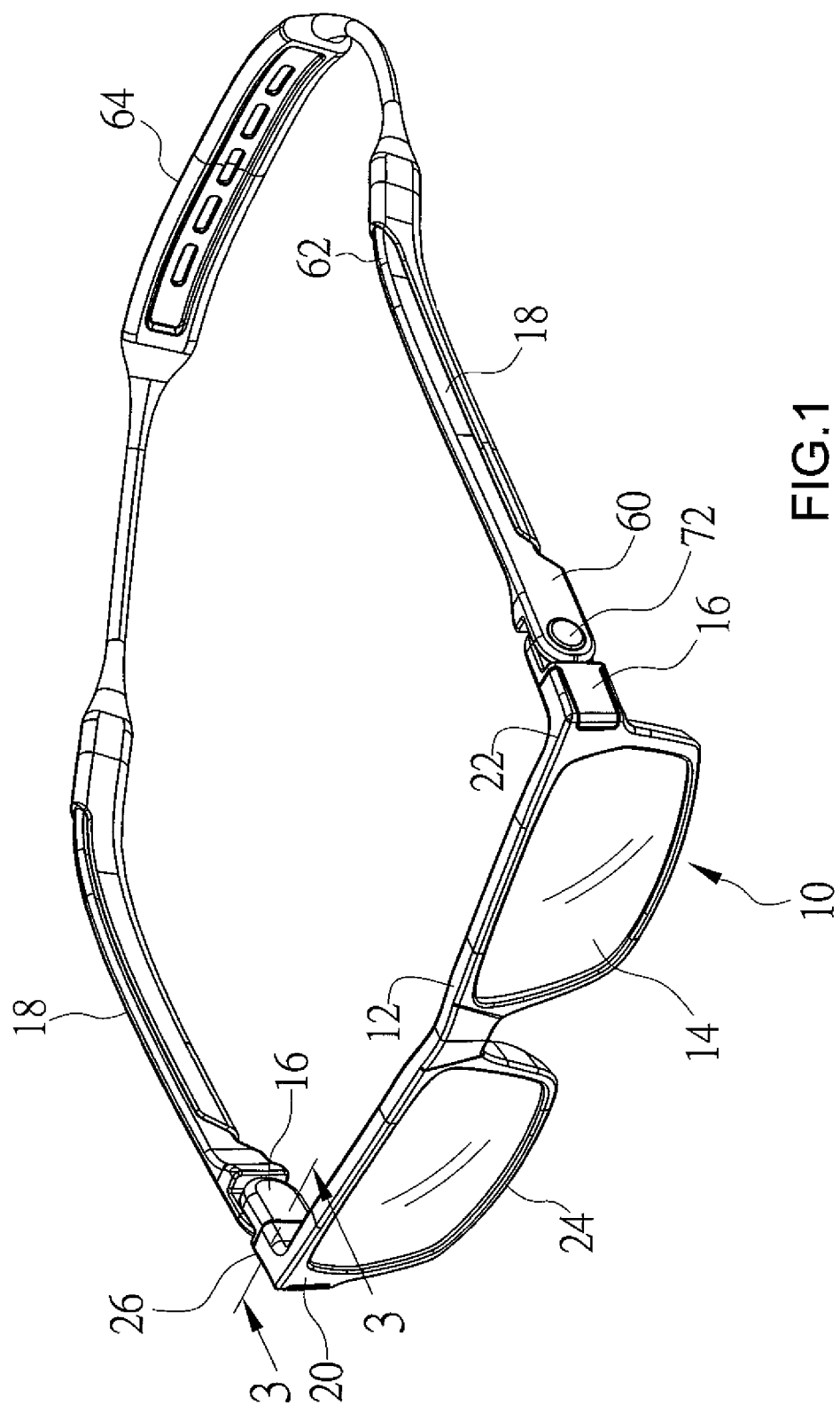
FIG. 1 is a perspective view of a pair of eyeglasses in accordance with a first embodiment of the present invention and illustrates temples of the pair of eyeglasses combines a neck cord.
Figure 2:
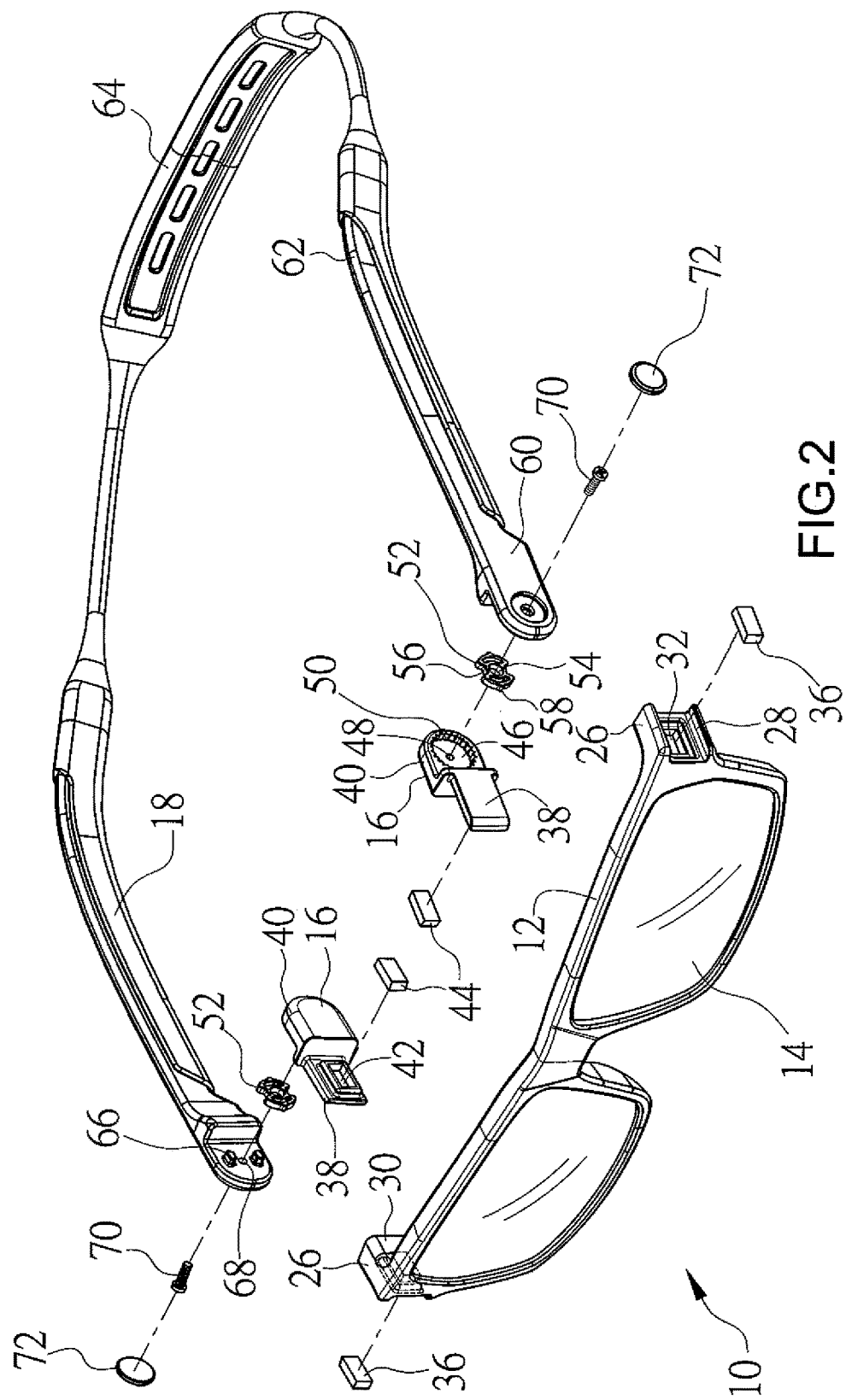
FIG. 2 shows an exploded view of the pair of eyeglasses of FIG. 1.
Figure 3:
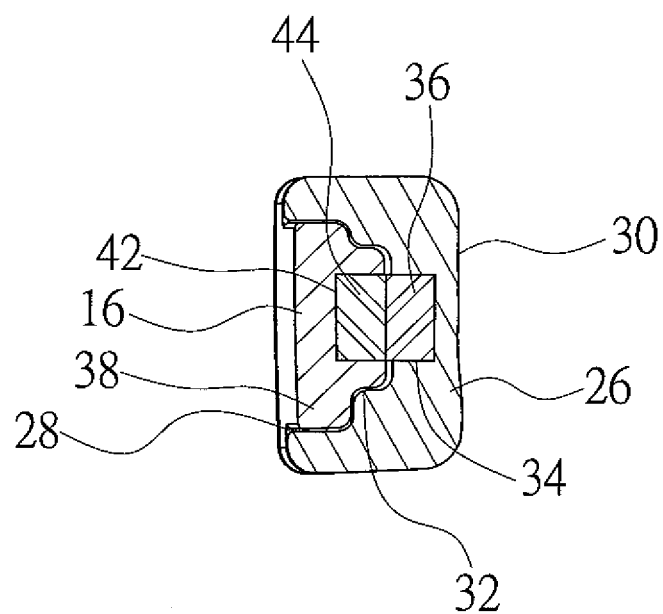
FIG. 3 is a sectional view of the pair of eyeglasses of FIG. 1 taken along section line 3-3 of FIG. 1, illustrating a connecting member and a glasses frame which link together.
Figure 4:
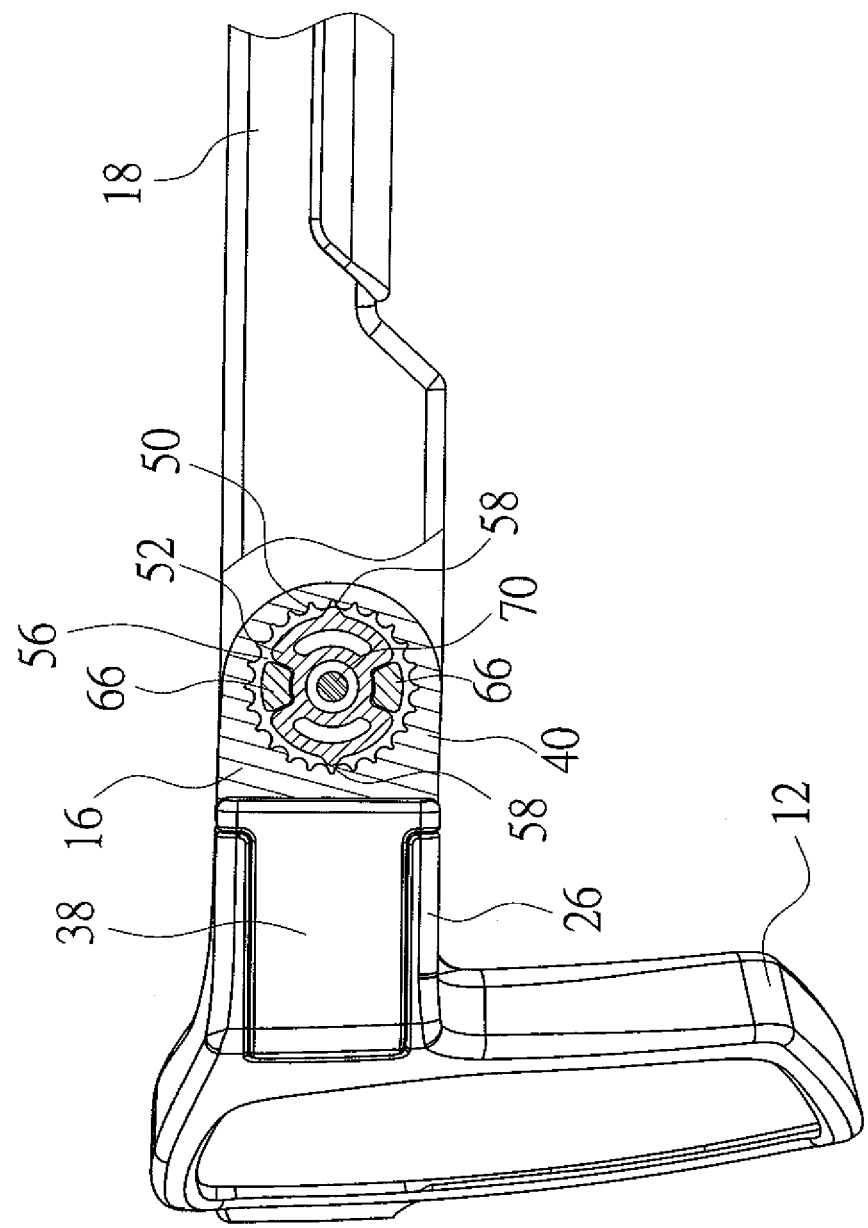
FIG. 4 is a partial side view of the pair of eyeglasses of FIG. 1 and illustrates the connecting member and a temple linked to each other.

A pair of eyeglasses 10 according to a first embodiment of the present invention is shown in FIGS. 1 through 6 of the drawings and includes a glasses frame 12, at least one lens 14, two connecting members (first and second connecting members) 16, and two temples (first and second temples) 18. The eyeglasses 10 may be a pair of sunglasses, leisure eyeglasses, sports eyeglasses, protective goggles, near-sighted eyeglasses, farsighted spectacles, presbyopic glasses, etc. The glasses frame 12 is made of materials including, without limitation, metal, alloy, or plastic. Both the connecting members 16 and the temples 18 are made of plastic, rubber, or metal. The connecting members 16 and the corresponding temples 18 which are respectively identical to each other in structure are explained according to one of the connecting members 16 and one corresponding temple 18.

The glasses frame 12 includes first and second ends 20 and 22 spaced in a lateral direction. The glasses frame 12 further includes at least one lens support slot 24 located between the first and second ends 20 and 22. In this embodiment, the glasses frame 12 includes two lens support slots 24 in which two lenses 14 are respectively installed. The glasses frame 12 further includes two coupling bases 26 each extending inward from one of the first and second ends 20 and 22 of the glasses frame 12 in a longitudinal direction perpendicular to the lateral direction. Each coupling base 26 includes outer and inner surfaces 28 and 30 with the inner surfaces 30 of the two coupling bases 26 opposite to each other. A recess 32 is formed in the outer surface 28 of each coupling base 26, and a cavity 34 is designed in the recess 32 for accommodating a first coupling piece 36 (see FIG. 3). In this embodiment, the first coupling piece 36 is a magnet.

Each connecting member 16 is detachably connected to the glasses frame 12 and includes spaced first and second segments 38 and 40. The first segment 38 of each connecting member 16 is held in the recess 32 of a corresponding coupling base 26 and includes a cavity 42 in an inner side thereof (see FIG. 3). A second coupling piece 44 is accommodated in the cavity 42 and coupled with the first coupling piece 36 in the corresponding coupling base 26, so that the connecting member 16 is fixed on the glasses frame 12. In this embodiment, the second coupling piece 44 is a magnet attracting the first coupling piece 36 (another magnet), allowing the connecting members 16 to be securely coupled with the glasses frame 12. A recessed portion 46 is formed in an outer surface of the second segment 40 of each connecting member 16. A mounting hole 48 is provided in the recessed portion 46, and a plurality of serrate slots 50 is designed in an inner perimeter of the recessed portion 46. Furthermore, a positioning block 52 is rotatably held inside the recessed portion 46 and includes a pinhole 54 therein. The positioning block 52 further includes at least one notch 56 as well as at least one serrate portion 58 around an outer circumference thereof. In this embodiment, the positioning block 52 includes two spaced notches 56 and two spaced serrate portions 58 with the notches 56 and the serrate portions 58 spaced from each other. The serrate portions 58 of the positioning block 52 inside the recessed portion 46 are coupled with two of the serrate slots 50.

Figure 5:
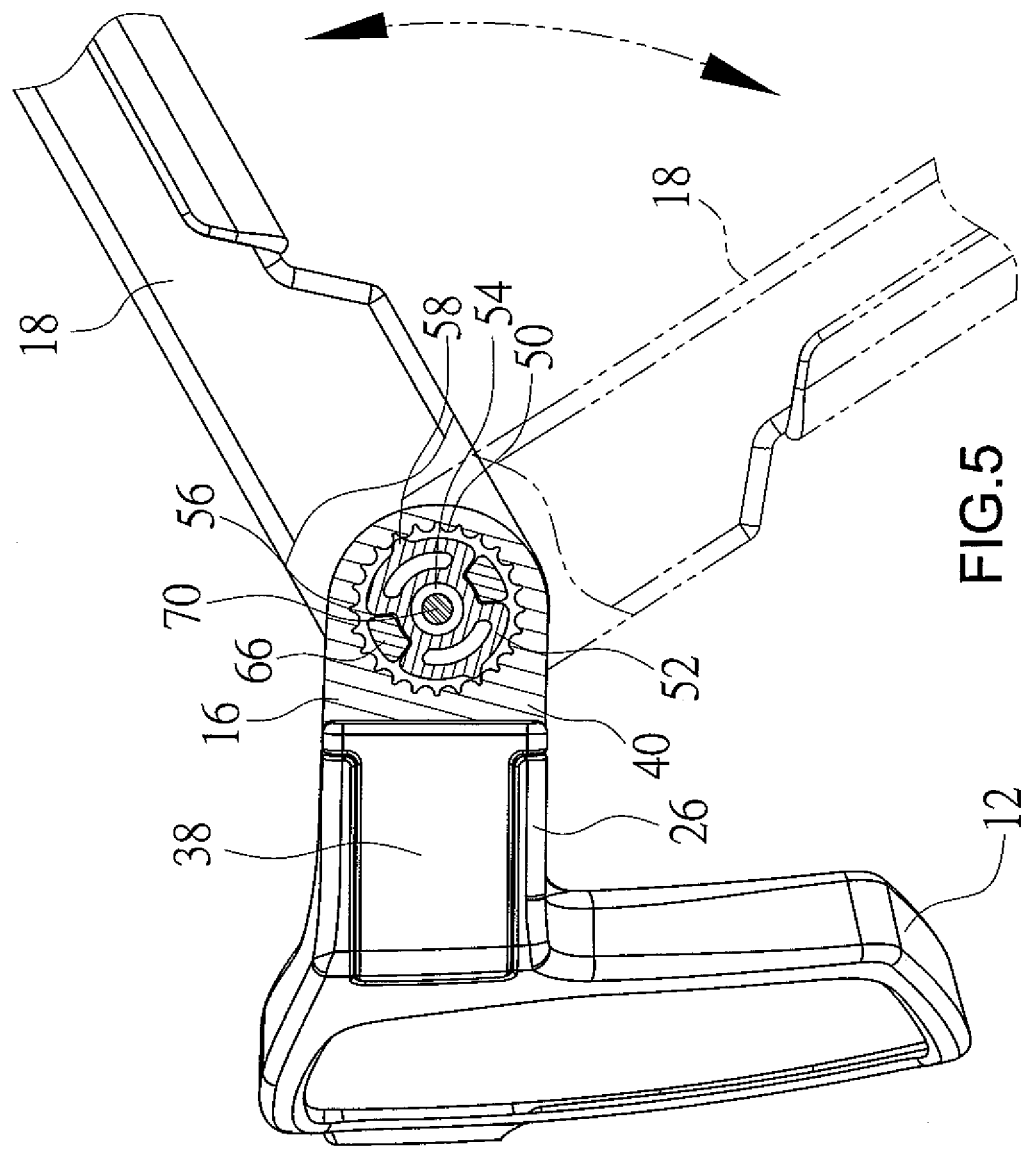
FIG. 5 is a schematic view similar to FIG. 4 and illustrates that the temple performs pivotal rotation relative to the glasses frame.
Figure 6:
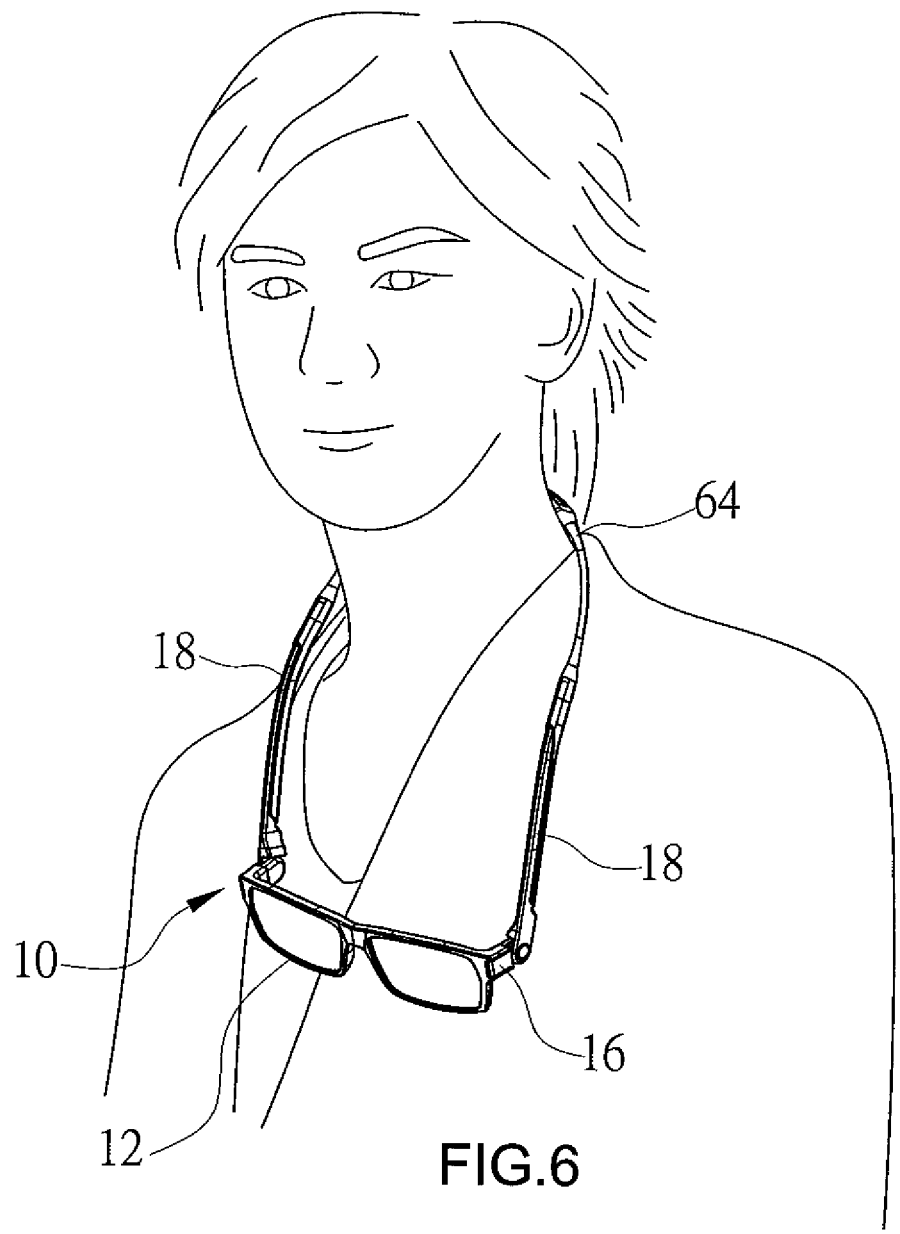
FIG. 6 is a schematic view which illustrates the pair of eyeglasses of FIG. 1 hung on a user's chest.

Each temple 18 includes front and rear ends 60 and 62 spaced in a length direction thereof. The rear end 62 of each temple 18 is adapted to be worn on a user's ear, and at the rear ends 62 of the two temples 18 is installed a neck cord 64 which is adapted to be hung on a user's neck (FIG. 6). The front end 60 of each temple 18 links the second segment 40 of a corresponding connecting member 16. In this embodiment, two convex columns 66 are formed at an inner surface of the front end 60 of each temple 18 and respectively coupled with the two spaced notches 56 of the positioning block 52. Furthermore, a connecting hole 68 is provided in the front end 60 of each temple 18, and a fastener or pivot 70 extends in the lateral direction through the connecting hole 68 of each temple 18 and the pinhole 54 of the positioning block 52 and is driven into the mounting hole 48 of each connecting member 16 for combination of the temple 18 and the corresponding connecting member 16, so that the temple 18 performs upward/downward pivotal rotation relative to the glasses frame 12 about an axis defined by the pivot 70 (FIG. 5). With each temple 18 pivotally rotated to a predetermined angle relative to the glasses frame 12, the serrate portions 58 of the positioning block 52 are coupled with and positioned in two serrate slots 50 of the corresponding connecting member 16. Moreover, a hole plug 72 is externally mounted on the front end 60 of each temple 18 for covering the pivot 70.

In the present invention, the pair of eyeglasses 10 features temples 18 removed and fixed conveniently. Specifically, both each temple 18 and a corresponding connecting member 16 can removed from the glasses frame 12 when the second coupling piece 44 and the first segment 38 of the corresponding connecting member 16 are separated from the first coupling piece 36 and the coupling base 26 with which the corresponding connecting member 16 is coupled. On the other hand, the temple 18 to be assembled is securely fixed on the glasses frame 12 when the first segment 38 of the connecting member 16 is held in the recess 32 of the coupling base 26 and the second coupling piece 44 combines the first coupling piece 36. Thus, the pair of eyeglasses 10 hung on a user's chest with the neck cord 64 can be removed from the user's head conveniently when the first segment 38 of one of the connecting members 16 and the second coupling piece 44 on the connecting member 16 are respectively separated from a corresponding coupling base 26 of the glasses frame 12 and the first coupling piece 36 on the corresponding coupling base 26. Moreover, the pair of eyeglasses 10 hung on a user's chest with the neck cord 64 plays a role in ornamentation and matches apparel, because an angle formed by the temples 18 relative to the glasses frame 12 can be changed by the user upward or downward (FIGS. 5 and 6).

Figure 7:
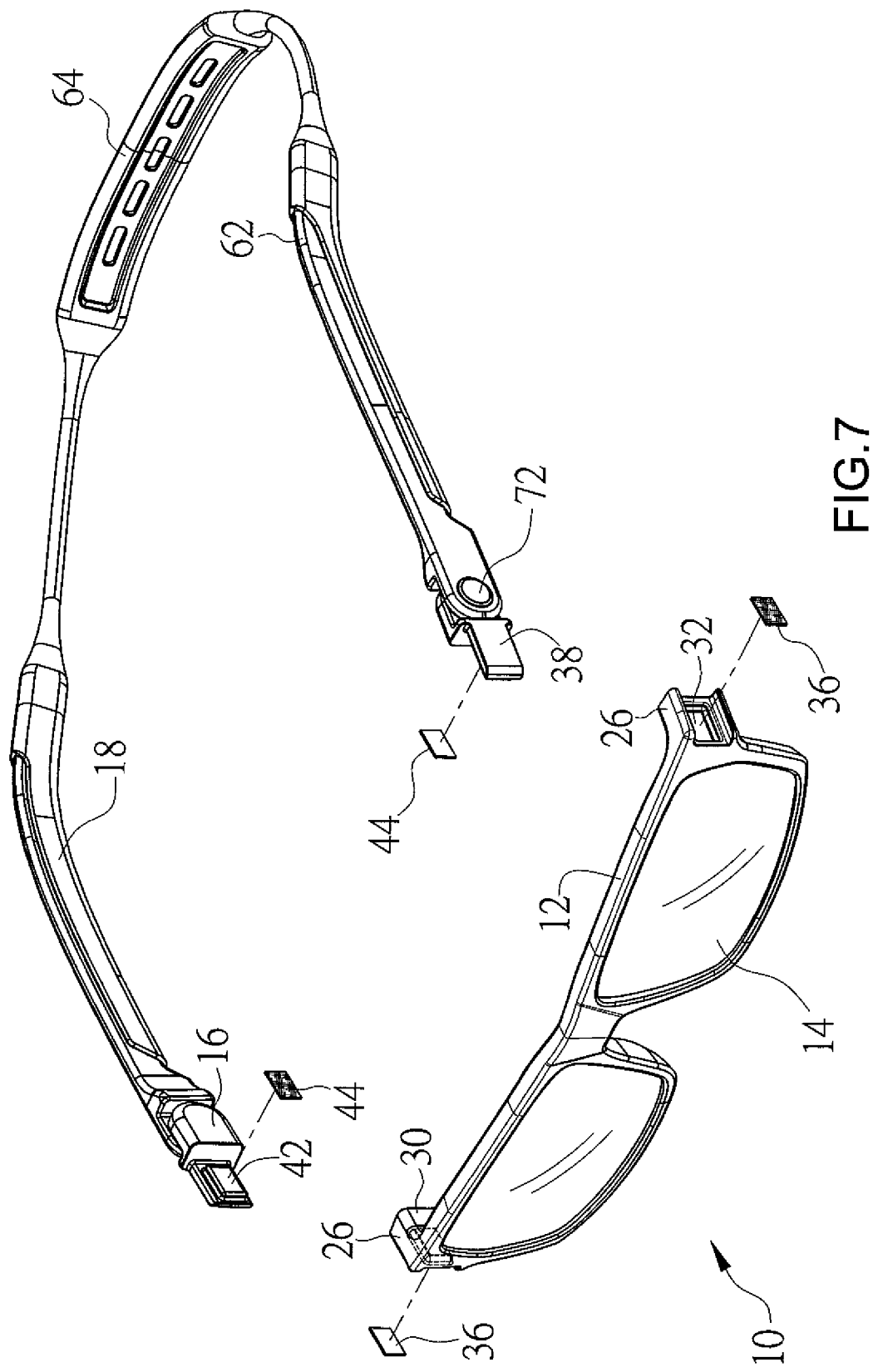
FIG. 7 is an exploded view of a pair of eyeglasses in a second embodiment of the present invention.
Figure 8:
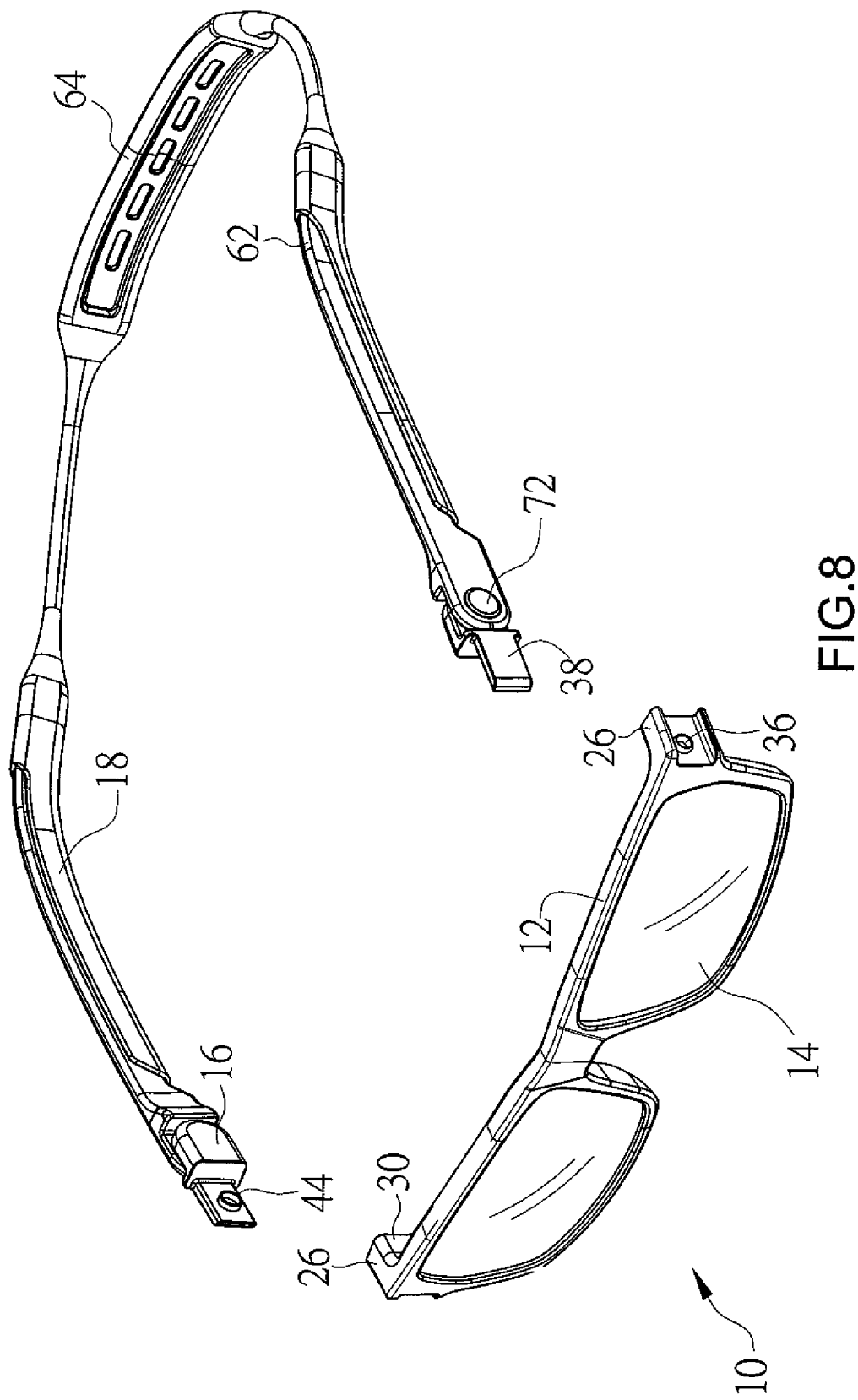
FIG. 8 is an exploded view of a pair of eyeglasses in a third embodiment of the present invention.
Figure 9:
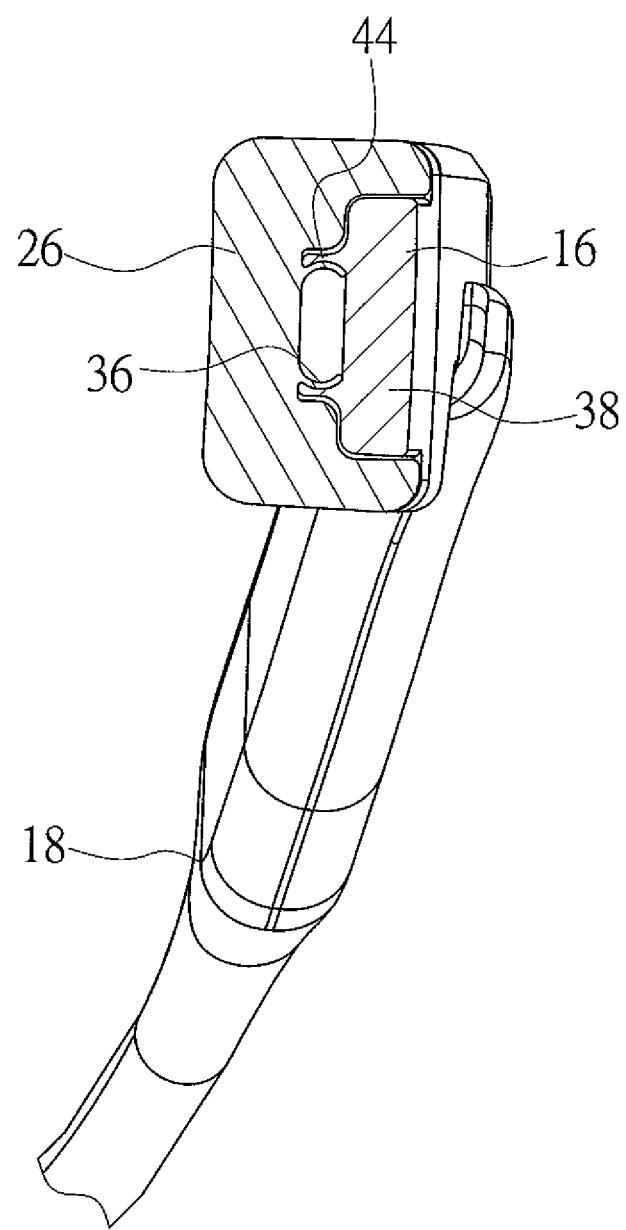
FIG. 9 is a schematic, sectional view of the pair of eyeglasses of FIG. 8 and illustrates a connecting member and a glasses frame linked to each other.
Figure 11:
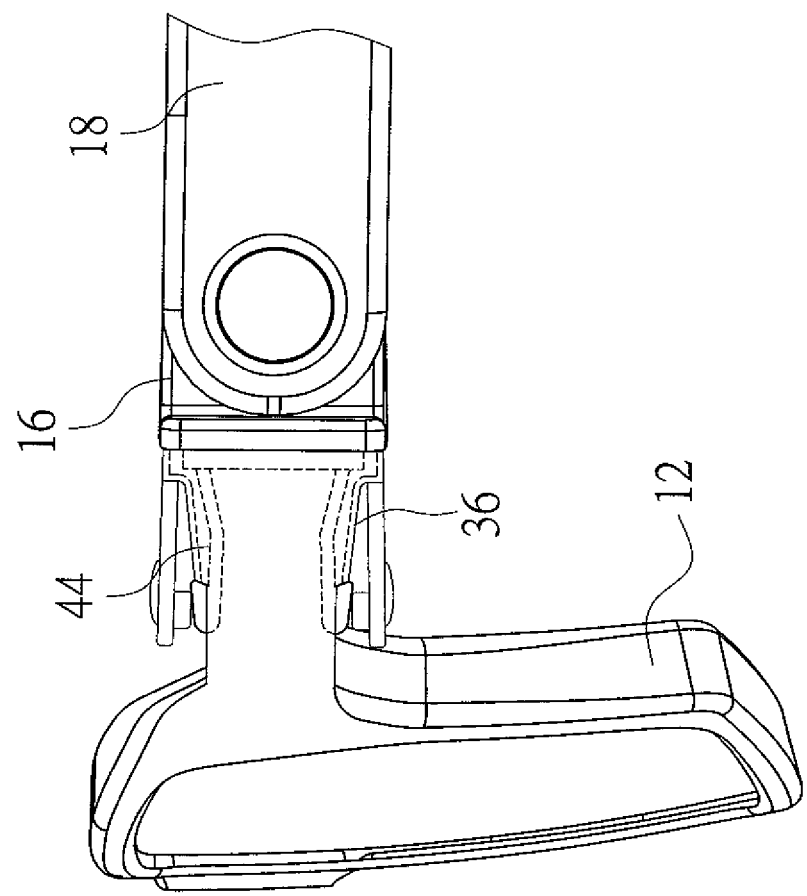
FIG. 11 is a schematic side view of the pair of eyeglasses of FIG. 10.

FIG. 7 illustrates a pair of eyeglasses 10 according to a second embodiment of the present invention. In this embodiment, the first and second coupling pieces 36 and 44 are two fasteners with a loop side and a hook side, respectively. As such, each temple 18 of the eyeglasses 10 can be easily removed or fixed by detachable combination of the fasteners. FIG. 8 and FIG. 9 illustrate a pair of eyeglasses 10 according to a third embodiment of the present invention. In this embodiment, the first and second coupling pieces 36 and 44 are a male buckle fastener and a female buckle fastener, respectively. As such, each temple 18 of the eyeglasses 10 can be easily removed or fixed by detachable combination of the male and female buckle fasteners. FIG. 10 and FIG. 11 illustrate a pair of eyeglasses 10 according to a fourth embodiment of the present invention. In this embodiment, the first coupling piece 36 is a female part of a snap-fit buckle and the second coupling piece 44 is a male part of a snap-fit buckle. As such, each temple 18 of the eyeglasses 10 can be easily removed or fixed by detachable combination of the female and male parts of the snap-fit buckle.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A pair of eyeglasses comprising:

a glasses frame including first and second ends spaced in a lateral direction, with the glasses frame further including two coupling bases each extending inward from one of the first and second ends of the glasses frame in a longitudinal direction perpendicular to the lateral direction, wherein each coupling base includes outer and inner surfaces spaced in the lateral direction, with the inner surfaces of the two coupling bases opposite to each other, with a recess and a first coupling piece provided in the outer surface of each coupling base;

a connecting member including a first segment and a second segment spaced from the first segment in the longitudinal direction, with the first segment of the connecting member connected to a corresponding coupling base of the glasses frame, with a recessed portion formed in an outer surface of the second segment of the connecting member, with a plurality of serrate slots designed in an inner perimeter of the recessed portion, with a positioning block rotatably held inside the recessed portion and including at least one notch and at least one serrate portion around an outer circumference thereof, with the at least one serrate portion of the positioning block coupled with at least one of the plurality of serrate slots, with the first segment of the connecting member held in the recess of the corresponding coupling base and including a second coupling piece which combines the first coupling piece on the corresponding coupling base, with the connecting member detachably connected to the glasses frame; and a temple including front and rear ends spaced in a length direction thereof, with at least one convex column formed at the front end of the temple and coupled with the at least one notch of the positioning block, with a pivot extending through the temple and the positioning block in the lateral direction and into the connecting member, with the temple performing upward/downward pivotal rotation relative to the glasses frame about an axis defined by the pivot.

2. The pair of eyeglasses according to claim 1, wherein a mounting hole is provided in the recessed portion of the second segment of the connecting member, with the positioning block including a pinhole therein, with a connecting hole provided in the front end of the temple, with the pivot extending through the connecting hole of the temple and the pinhole of the positioning block and into the mounting hole of the connecting member.

3. The pair of eyeglasses according to claim 1, wherein the positioning block includes two spaced notches and two spaced serrate portions, with the two notches and the two serrate portions spaced from each other, with two convex columns formed at an inner surface of the front end of the temple and respectively coupled with the two notches of the positioning block.

4. The pair of eyeglasses according to claim 1, wherein the first and second coupling pieces are two magnets, respectively.

5. The pair of eyeglasses according to claim 1, wherein the first and second coupling pieces are two fasteners with a loop side and a hook side, respectively.

6. The pair of eyeglasses according to claim 1, wherein the first and second coupling pieces are a male buckle fastener and a female buckle fastener, respectively.

7. The pair of eyeglasses according to claim 1, wherein the first coupling piece is a female part of a snap-fit buckle, and the second coupling piece is a male part of a snap fit buckle.

* * * * *